United States Patent [19] [11] 3,903,066
Rohde [45] Sept. 2, 1975

[54] METHOD FOR REMOVING CATALYST RESIDUE FROM POLYPROPYLENE

[75] Inventor: Raymond Rohde, Bartlesville, Okla.

[73] Assignee: Phillips Petroleum Company, Bartlesville, Okla.

[22] Filed: Feb. 22, 1974

[21] Appl. No.: 444,870

Related U.S. Application Data

[63] Continuation of Ser. No. 263,221, June 15, 1972, abandoned, which is a continuation-in-part of Ser. No. 58,727, July 27, 1970, abandoned.

[52] U.S. Cl. ..... 260/93.7; 260/94.9 F; 260/94.9 GD
[51] Int. Cl. .............................................. C08f 1/88
[58] Field of Search ....... 260/94.9 F, 94.9 GD, 93.7

[56] References Cited
UNITED STATES PATENTS
2,886,561  5/1959   Reynolds et al. ............... 260/94.9 F
2,958,687  11/1960  Dunham et al. ................ 260/94.9 F
3,119,797  1/1964   McGaughy et al. ............. 260/94.9 F
3,280,092  10/1966  Edmonds ......................... 260/93.7

Primary Examiner—Stanford M. Levin

[57] ABSTRACT

Catalyst residue is removed from amorphous polypropylene product by water washing the polypropylene to remove water-soluble impurities therefrom, removing the resultant water, and thereafter dissolving the polypropylene in a hydrocarbon solvent having a boiling point below about 300°F. The catalyst residue is then filtered from the hydrocarbon solution of polypropylene.

15 Claims, No Drawings

METHOD FOR REMOVING CATALYST RESIDUE FROM POLYPROPYLENE

This application is a continuation of application Ser. No. 263,221 filed June 15, 1972, which in turn is a continuation-in-part of application Ser. No. 58,727, filed July 17, 1970, both now abandoned.

Amorphous polypropylene having a low impurity level is often desirable. Examples of the use made of such a material are for electrical cable fillers, bird repellents, pesticide-formulating agents, sealers for wounds on trees, alkali chemical carriers, additives for special purpose concretes, etc.

Other methods have been utilized to purify polypropylene material, but the use made of the resultant material often dictates a need for a polypropylene of greater purity.

This invention therefore provides a method for removing catalyst residues from amorphous polypropylene product resulting from polypropylene production by water washing the polypropylene, removing the resultant water and thereafter dissolving the polypropylene in a hydrocarbon solvent and separating the catalyst residue from the polypropylene by filtering the mixture and stripping volatile materials from the polypropylene. It is therefore an object of this invention to remove catalyst residue from polypropylene and produce a resultant cleaned polypropylene having improved purity.

In the operation of the method of this invention, an amorphous polypropylene product resulting from polypropylene production, as described in U.S. Pat. No. 3,342,794, for example, is washed with water which has a temperature greater than about 175°F. The wash can be accomplished in a single cycle or preferably in a plurality of wash cycles. Water-soluble residue of the polypropylene product including some catalyst residue is removed from the product during this washing step. Some water washing procedures that can be used cycle the product through a plurality of fresh hot water soaking and washings with intervening separation steps which require as much as 12 hours for completing the operation.

Subsequent to the hot water washing procedure, the polymer can be dried. Regardless of the hot water wash procedure utilized, the wash water is disposed of and thereafter the separated washed polypropylene is dissolved in a hydrocarbon solvent which has a boiling point below about 300°F. By separating the polypropylene from the wash water having soluble contaminants therein prior to dissolving the polypropylene in the solvent, it has been found that the polypropylene purity can be significantly increased. Where polypropylene plus hot solvent is contacted with water, as in some heretofore utilized procedures, the mixture often holds catalytic residue in solution and prevents it from precipitating for subsequent removal.

The solvent can be selected from hydrocarbons which have a boiling point below about 300°F. These solvents are preferably nonaromatic solvents which will completely dissolve the amorphous polypropylene. Examples of solvents that can be used, among others, are: naphtha, gasolines, hydrogen fluoride alkylate, neohexane, etc. Generally in the range of 0.01 to 100 g of polymer are dissolved in 100 ml of hydrocarbon solvent.

After the amorphous polypropylene has been dissolved by the solvent the catalyst residue is separated from the polypropylene by filtering the mixture. Filtering methods that can be used include any conventional means of filtering a solid from a liquid. Conventional means of centrifugation can also be employed.

In order to effectively and efficiently separate the polypropylene from the catalytic residue, it is preferred that the temperature and pressure of the solvent during contact with the amorphous polypropylene be maintained at values sufficient to maintain the solvent and solution substantially completely in the liquid phase. These temperatures and pressures depend upon the solvent and filtering method utilized and can easily be determined by one skilled in the art.

After filtering the residue from the polypropylene, the volatile materials are stripped from the polypropylene filtrate. This stripping procedure can be by heating the filtrate to a temperature sufficient to volatilize the solvent or higher, generally above about 0°F or higher depending on the solvent employed, or by applying a vacuum to the filtrate, for example.

An exemplary method of this invention for removing catalyst residue from amorphous polypropylene product is described as follows:

EXAMPLE

Amorphous polypropylene, obtained as a hydrocarbon-soluble product in a propylene polymerization process catalyzed by contact with a $TiCl_3 \cdot \frac{1}{3} AlCl_3$ complex and diethylaluminum chloride is flashed to remove dissolved propylene. Approximately 250 grams of the resultant black amorphous polypropylene was put in a 2000 milliliter beaker with 1,000 milliliters of water and boiled vigorously for about 1 hour. The water phase was thereafter decanted and a new charge of water added. This was repeated until the amorphous polypropylene was pure white.

A total of 76 g of the washed polymer was then dissolved in 500 ml of petroleum naphtha (boiling in the range of 160°–200°F) at a temperature of 120°F. The solution thus formed was vacuum filtered through a No. 1 filter paper, and the volatiles are evaporated from the filtrate. A total of 74 g of amorphous polypropylene polymer was recoverd.

The following table presents data showing the catalyst residue concentration in the polymer prior to and subsequent to the inventive solution filtration procedure.

TABLE I

| Residue Concentration In Polymer | Prior to Solution Filtration | Subsequent Solution Filtration |
|---|---|---|
| Titanium (ppm) | 250 | 36 |
| Aluminum (ppm) | 9 | 4 |
| Acetylacetone (ppm)* | 320 | 37 |

*Residue resulting from chelating agent used to treat the total propylene polymer for catalyst residue removal.

This example demonstrates that the process of this invention greatly reduces catalyst residues in amorphous polypropylene.

Other modifications and alterations of this invention will become apparent to those skilled in the art from the foregoing discussion and it should be understood that this invention is not to be unduly limited thereto.

What is claimed is:

1. A method for removing catalyst residues from amorphous polypropylene, comprising:

washing the amorphous polypropylene with a liquid consisting essentially of water at a temperature greater than about 175°F. prior to dissolving the amorphous polypropylene;

decanting the resultant water from the amorphous polypropylene;

thereafter dissolving said polypropylene in a hydrocarbon solvent to give a mixture of solid catalyst residues in a thus formed solution of said polypropylene;

separating catalyst residues from the polypropylene by filtering the mixture; and stripping volatile materials from the polypropylene.

2. A method, as set forth in claim 1, wherein the solvent is selected from a group comprising naphtha, gasolines, hydrogen fluoride alkylate, and neohexane.

3. A method, as set forth in claim 1, wherein said washing of said amorphous polypropylene with water is carried out at ambient pressure and at the boiling point of the water, and wherein the temperature and pressure of the solvent are maintained during contact with the polypropylene at values sufficient to maintain the solvent substantially completely in the liquid phase.

4. A method, as set forth in claim 1, wherein the volatile materials are stripped from the polypropylene by heating the polypropylene.

5. A method, as set forth in claim 1, wherein the volatile materials are stripped from the polypropylene by applying a vacuum to said polypropylene.

6. A method, as set forth in claim 1, wherein the solvent is naphtha having a boiling point in the range of about 160°–200°F and a volume sufficient to substantially completely dissolve the polypropylene product.

7. A method, as set forth in claim 1, wherein the hydrocarbon solvent is nonaromatic.

8. A method for removing catalyst residues from amorphous polypropylene, comprising:

washing the amorphous polypropylene with a liquid consisting essentially of water at a temperature greater than about 175°F. prior to dissolving same;

separating the resulting water, having water-soluble residues therein, from the amorphous polypropylene so as to remove said water-soluble residues from said polypropylene;

thereafter dissolving said polypropylene in a hydrocarbon solvent, said hydrocarbon solvent having a boiling point below about 300°F;

separating the insoluble catalyst residues from the solution of polypropylene; and stripping volatile materials from the polypropylene.

9. A method, as set forth in claim 8, wherein the solvent is selected from the group comprising naphtha, gasolines, hydrogen fluoride alkylate, and neohexane.

10. A method, as set forth in claim 8, wherein the temperature and pressure are such that the solution of polypropylene is maintained substantially completely in the liquid phase.

11. A method, as set forth in claim 8, wherein the volatile materials are stripped from the polypropylene by heating the solution which is free of said insoluble catalyst residue.

12. A method, as set forth in claim 8, wherein the volatile materials are stripped from the polypropylene by applying a vacuum to said solution which is free of said insoluble catalyst residue.

13. A method, as set forth in claim 8, wherein the solvent is naphtha having a boiling point in the range of about 160°–200°F. in a volume sufficient to substantially completely dissolve the polypropylene product.

14. A method, as set forth in claim 8, wherein the hydrocarbon solvent is non-aromatic.

15. A method, as set forth in claim 8, wherein the polypropylene is washed with said water at the boiling point of said water, and wherein the solvent is petroleum naphtha, and the temperature and pressure are maintained during contact of the solvent with the polypropylene at values sufficient to maintain the solution substantially completely in a liquid phase.

* * * * *